United States Patent
Lin

(10) Patent No.: US 9,344,410 B1
(45) Date of Patent: May 17, 2016

(54) TELECOMMUNICATION METHOD FOR SECURELY EXCHANGING DATA

(71) Applicant: Wei Lin, Shanghai (CN)

(72) Inventor: Wei Lin, Shanghai (CN)

(73) Assignee: SAP SE, Wiesbaden (DE)

( * ) Notice: Subject to any disclaimer, the term of this patent is extended or adjusted under 35 U.S.C. 154(b) by 0 days.

(21) Appl. No.: 14/529,182

(22) Filed: Oct. 31, 2014

(51) Int. Cl.
*H04L 29/06* (2006.01)
*H04W 12/04* (2009.01)

(52) U.S. Cl.
CPC .......... *H04L 63/0428* (2013.01); *H04L 63/061* (2013.01); *H04W 12/04* (2013.01)

(58) Field of Classification Search
CPC .................................................. H04L 63/0428
See application file for complete search history.

(56) References Cited

U.S. PATENT DOCUMENTS

| | | | | |
|---|---|---|---|---|
| 7,137,006 | B1 * | 11/2006 | Grandcolas | G06F 21/41 713/180 |
| 8,819,444 | B2 | 8/2014 | Shahbazi et al. | |
| 2002/0090089 | A1 * | 7/2002 | Branigan | H04L 63/0428 380/270 |

(Continued)

FOREIGN PATENT DOCUMENTS

WO    WO 2012/177253    12/2012

OTHER PUBLICATIONS

Brutch, G. Tanseem. Brutch C. Paul. "Mutual Authentication, Confidentiality, and Key Management (MACKMAN) System for Mobile Computing and Wireless Communication" pp. 308-317. Computer Security Applications Conference, Proceedings, 14th Annual. IEEE, 1998.*

(Continued)

*Primary Examiner* — Shawnchoy Rahman
(74) *Attorney, Agent, or Firm* — Leveque Intellectual Property Law, P.C.

(57) ABSTRACT

The invention provides for a telecommunication method of securely exchanging unencrypted data between a telecommunications device and a first server computer system via a digital cellular wireless telecommunications network, wherein the telecommunications device is a battery powered mobile end user telecommunications device, wherein the method comprises the steps of: encrypting the unencrypted data using a first encryption algorithm into first encrypted data, sending the first encrypted data to a second server computer system via a first network connection of the digital cellular wireless telecommunications network, storing the first encrypted data by the second server computer system, sending an order request to the first server computer system via a second network connection of the digital cellular wireless telecommunications network by the telecommunications device, sending a data publishing request to the second server computer system, generating a cryptographic key pair, sending the first encrypted data, the public key, and the private key to the telecommunications device, decrypting the first encrypted data into the unencrypted data, encrypting the unencrypted data into second encrypted data using the public key, sending the second encrypted data to the second, generating a web service for providing the second encrypted data via an URL, sending the URL to the telecommunications device, sending the URL and the private key, requesting the second encrypted data from the second server computer system, sending the second encrypted data to the first server computer system by the second server computer system using the wired network connection, decrypting the second encrypted data by the first server computer system into the unencrypted data, and combining the order request with the unencrypted data.

15 Claims, 5 Drawing Sheets

(56) References Cited

U.S. PATENT DOCUMENTS

2007/0130462 A1   6/2007  Law et al.
2013/0144785 A1*  6/2013  Karpenko ............ G06Q 20/409
                                                    705/44
2013/0268357 A1*  10/2013  Heath ..................... H04L 63/00
                                                   705/14.53

OTHER PUBLICATIONS

EPO, Extended European Search Report, EP 14191256.8, Feb. 23, 2015.

\* cited by examiner

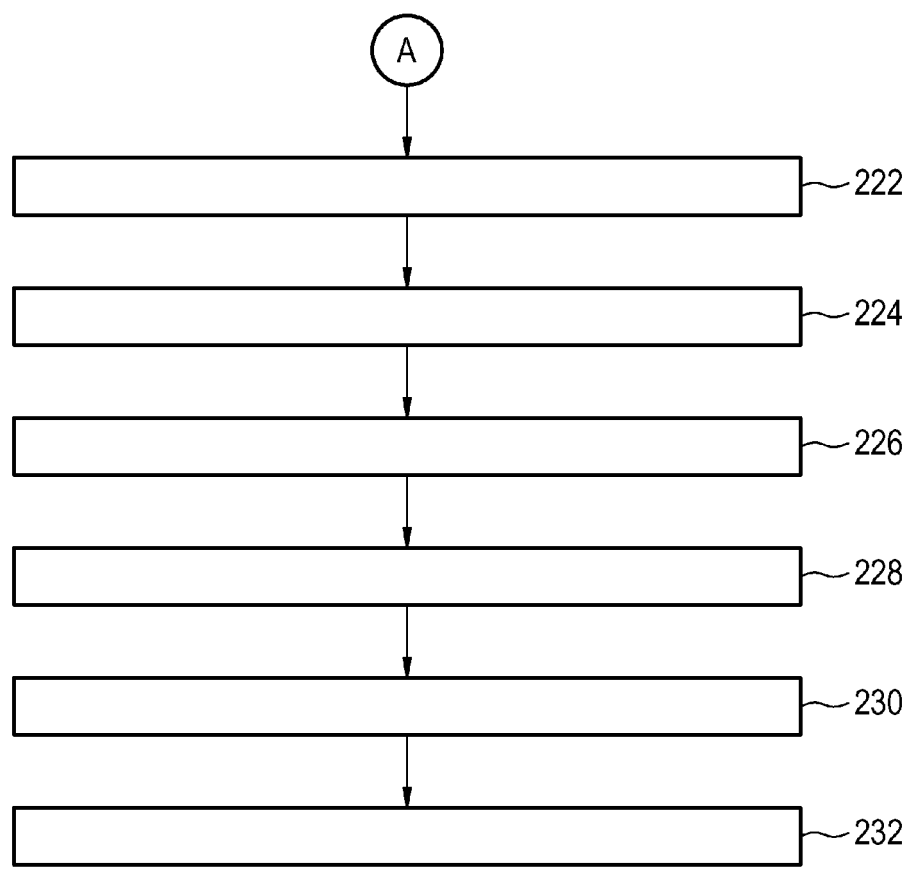

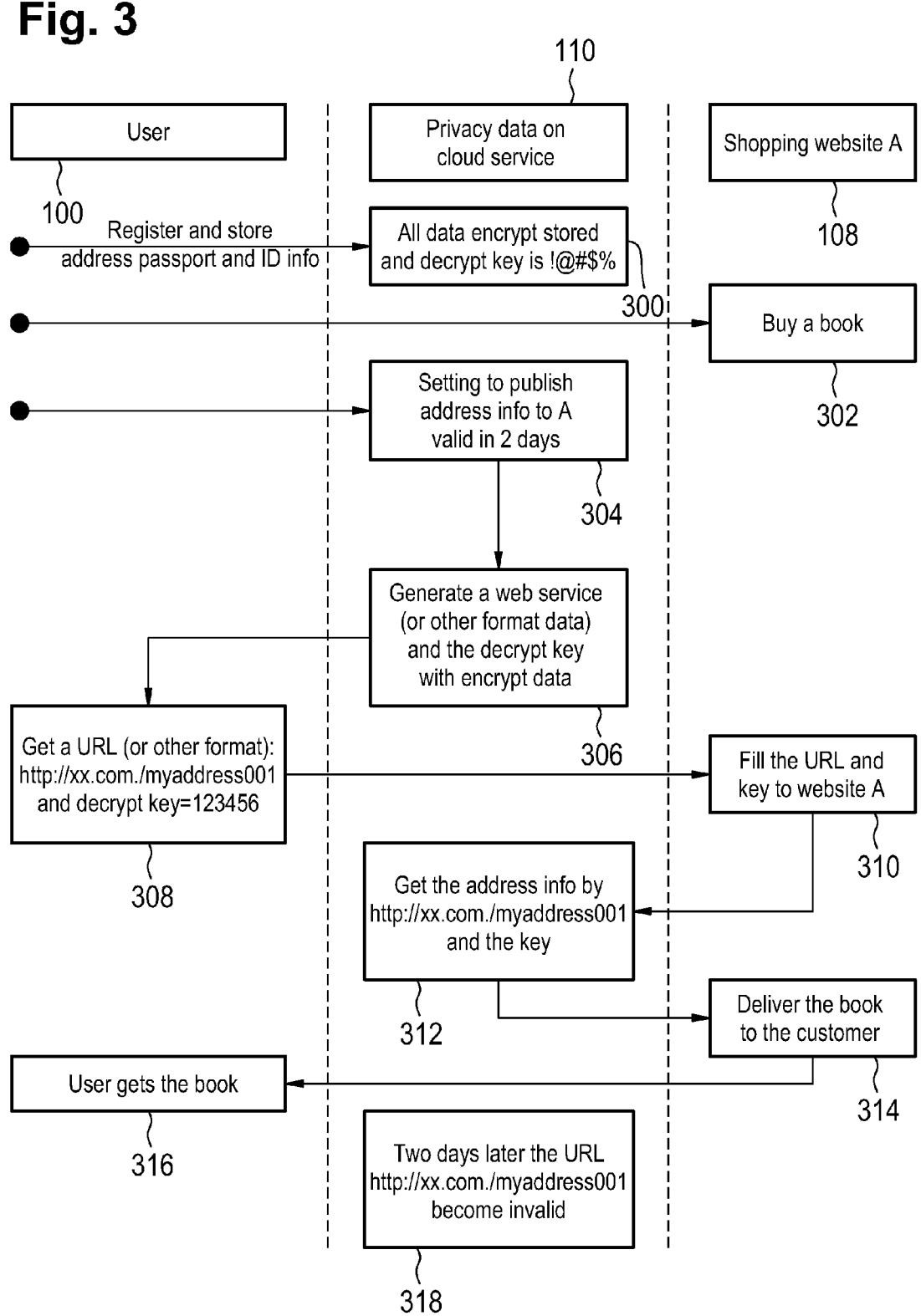

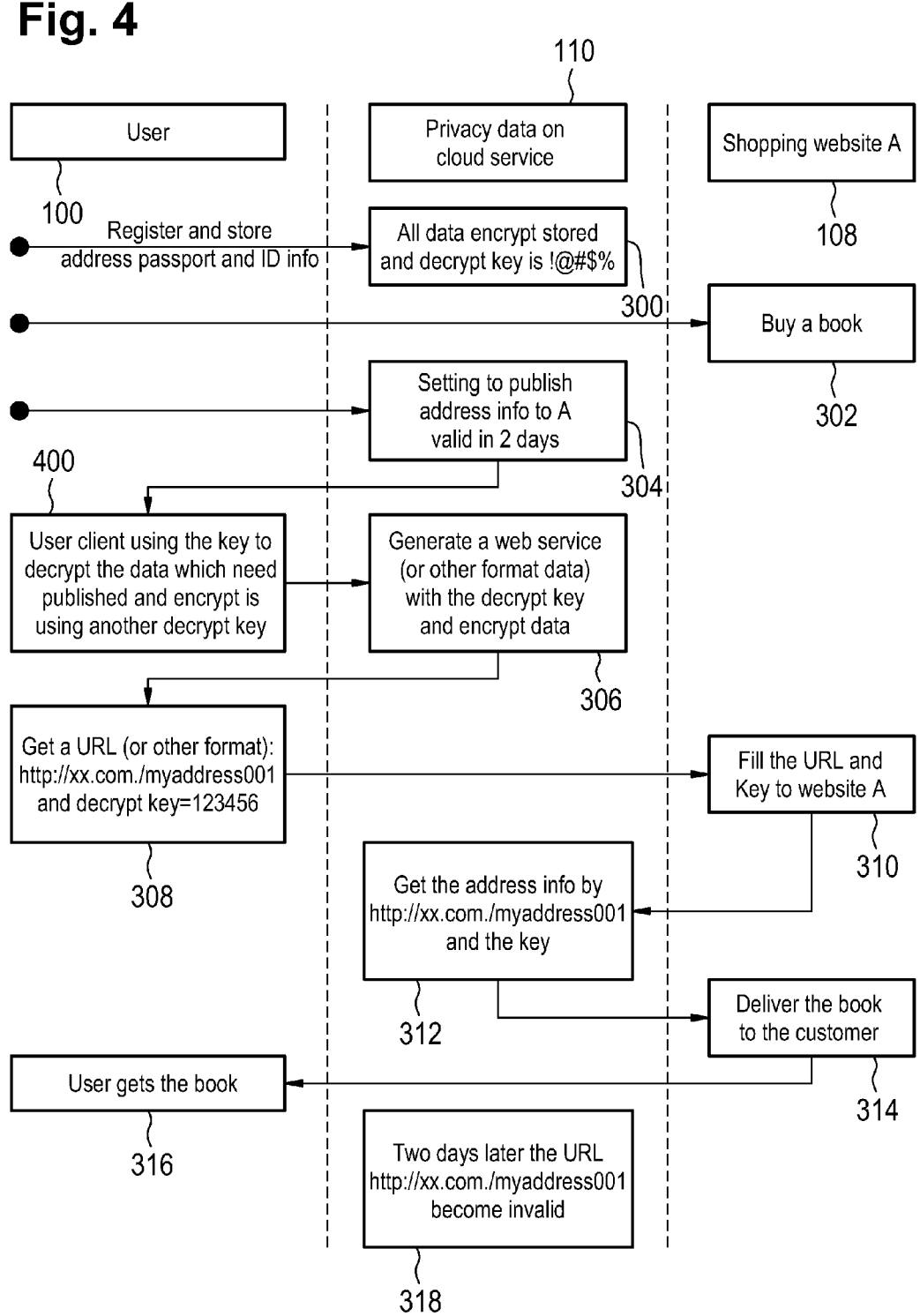

TELECOMMUNICATION METHOD FOR SECURELY EXCHANGING DATA

BACKGROUND OF THE DISCLOSURE

1. Field of the Disclosure

The invention relates to the exchange of data securely, in particular to the exchange of data using a digital cellular wireless communications network.

2. Description of the Related Art

An increasing number of people are exchanging sensitive data using telecommunication devices over digital cellular wireless communication networks. It is not safe to store this information on the telecommunications device its self, because it can be stolen. Likewise it is inconvenient for the user to always enter data into their telecommunications device when completing a transaction or using a secure website. These devices typically have touch screens, and it can be time consuming to enter the same data for similar transactions which are repeatedly performed.

SUMMARY OF THE PRESENT DISCLOSURE

The invention provides for a method and a server in the independent claims. Embodiments are given in the dependent claims.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A 'server' as used herein encompasses a computing device operable for receiving or the sending of data across a network. A server may also provide services over the network. For example a server may provide storage or a web service to another computing device. A server may also be referred to as a server computer system.

In one aspect the invention provides for a telecommunication method of securely exchanging unencrypted data between a telecommunications device and a first server via a digital cellular wireless telecommunications network. A server as used herein encompasses a computational device that is able to store and/or provide data over a network connection. The telecommunications device is a battery-powered mobile end-user telecommunications device. The telecommunications device for example, but not limited to: is a mobile telephone, a smart phone, and a tablet.

The method comprises the step of encrypting the unencrypted data using a first encryption algorithm into first encrypted data by the telecommunications device. The telecommunications device may for example, but is not limited to be a mobile telephone, a computing device which connects over a mobile telephone device, or a tablet. The method further comprises the step of sending the first encrypted data to a second server via a first network connection of the digital cellular wireless telecommunications network via the telecommunications device. The method further comprises the step of storing the first encrypted data via the second server. The method further comprises the step of sending an order request to the first server via a second network connection of the digital cellular wireless telecommunications network by the telecommunications device. The order request could for instance be a purchase in an online shop. The method further comprises the step of sending a data publishing request to the second server via the first network connection by the telecommunications device.

The data publishing request may be a request by the telecommunications device to provide the first server with data by the second server. The method further comprises the step of generating a cryptographic key pair by the second server in response to the data publishing request. The cryptographic key pair comprises a public key and a private key. The cryptographic key pair is a cryptographic key pair which is used to fulfill the data publishing request and after this is finished the cryptographic key pair may be deleted. The method further comprises the step of sending the first encrypted data, the public key and the private key to the telecommunications device in response to the data publishing request via the first network connection by the second server. The method further comprises the step of decrypting the first encrypted data into the unencrypted data by the telecommunications device. This may be accomplished using the first encryption algorithm. The first encryption algorithm may for instance be an alternative public key or an asymmetric encryption algorithm or the first encryption algorithm may be a symmetric encryption algorithm. The method further comprises the step of encrypting the unencrypted data into second encrypted data using the public key by the telecommunications device. The public key is an encryption key and the private key is used for decryption.

The method further comprises the step of sending the second encrypted data to the second server via the first network connection by the communications device. The method further comprises the step of generating a web service for providing the second encrypted data via a URL by the second server. The method further comprises the step of sending the URL to the telecommunications device via the first network connection by the second server. The method further comprises the step of sending the URL and the key to the first server via the second network connection by the telecommunications device. The method further comprises the step of requesting the second encrypted data from the second server by the first server using a wired network connection to access the web service at the URL. The method further comprises the step of sending the second encrypted data to the first server by the second server using the wired network connection in response to the request of the second encrypted data by the second server. The method further comprises the step of decrypting the second encrypted data by the first server into the unencrypted data using the public key. The method further comprises the step of combining the order request with the unencrypted data by the first server.

This method may have the benefit that the telecommunications device can securely send the unencrypted data to the first server. The method may further have the benefit that the unencrypted data does not need to be stored on the telecommunications device. For instance if the telecommunications device were lost the unencrypted data for instance may be extracted from its memory or storage. Storing the data on the second server prevents this from happening. The method may also further have the benefit that the second server provides the data to the first server so that the first server is more confident that the data is authentic. For example a malicious software could be installed on the telecommunications device. That the data is provided via the second server may provide more confidence that the data is authentic.

In another embodiment the combining the order request with the unencrypted data by the first server comprises taking all or a portion of unencrypted data and adding it or concatenating it with the order request. For instance the unencrypted data may provide private details or payment data that may be combined with the order request.

In another embodiment the web service becomes inoperative after a predetermined duration. In this example the first server is able to retrieve the second unencrypted data only for a predetermined duration. After this the URL becomes inoperative and the first server can no longer retrieve the second unencrypted data. This provides more security that the second unencrypted data will not be stolen.

In another embodiment the method further comprises the step of deleting the unencrypted data, the second unencrypted data, the URL, and/or the public key after combining the order request with the unencrypted data by the first server. This embodiment has the benefit that the first server removes the data and encryption keys after it has been used. This provides a higher level of security that the data will not be stolen.

In another embodiment the first server is prevented from storing the unencrypted data after combining the order request by a security application. A security application as used herein encompasses executable code in the form of a program or application but controls how the unencrypted data and the subsequent encrypted unencrypted data is handled by the first server. Reception of the second encrypted data by the second server from the first server using the wired network connection to access the web service at the URL is performed by the security application. This step may have the benefit that since the security application handles the access to the URL other software programs on the first server are not able to handle the second encrypted data or the unencrypted data. The decrypting of the second encrypted data by the first server into the unencrypted data using the private key is performed by the security application.

In another embodiment the reception of the order request from the telecommunications device to the first server via the wired network connection is performed by the security application.

In another embodiment the method further comprises sending a data request from the first server to the telecommunications device via the first network connection in response to the order request. The method further comprises redacting the unencrypted data in accordance with the data request before encrypting the unencrypted data into the second encrypted data. This may be beneficial when in order to combine the order request with the unencrypted data not all of the data in the unencrypted data is required. This may provide a higher level of the data security.

In another embodiment the unencrypted data comprises payment data and/or address data.

In another embodiment the second server is a cloud storage server.

In another embodiment the first server is an online shop.

In another embodiment the method further comprises the step of deleting the second encrypted data from the telecommunications device after sending the second encrypted data to the second server via the first network connection.

In another embodiment the method further comprises the step of deleting the unencrypted data from the telecommunications device after encrypting the unencrypted data into the second encrypted data using the public key.

In another embodiment the method further comprises the step of deleting the unencrypted data from the telecommunications device after encrypting the unencrypted data into the first encrypted data.

In another embodiment the method further comprises deleting the first encrypted data from the communications device after sending the first encrypted data to the second server.

The steps of deleting data from the telecommunications device may have the benefit that if the deleted data has been deleted it is impossible to have it stolen or lost if the telecommunications device is lost or stolen.

In another aspect the invention provides for a second server for exchanging unencrypted data between a telecommunications device and a first server via digital cellular wireless telecommunications network. The telecommunications device is a battery-powered mobile end-user telecommunications device. The second server comprises a memory for storing machine-executable instructions. The second server further comprises a processor for executing the machine-executable instructions. Execution of the machine-executable instructions causes the processor to receive first encrypted data via a first network connection of the digital cellular wireless telecommunications network from the telecommunications device. Further execution of the instructions causes the processor to store the first encrypted data. Further execution of the instructions causes the processor to receive a data publishing request via the first network connection from the telecommunications device.

Further execution of the machine-executable instructions causes the processor to generate a cryptographic key pair by the second server in response to the data publishing request. The cryptographic key pair comprises a public key and a private key. Execution of the instructions further causes the processor to send the first encrypted data, the public key, and the private key to the telecommunications device in response to the data publishing request via the first network connection. This for instance may be done using a web protocol that encrypts the data. Execution of the instructions further causes the processor to receive a second encrypted data from the second server via the first network connection from the communications device. Execution of the instructions further causes the processor to generate a web service for providing the second encrypted data via a URL. Execution of the instructions further causes the processor to send the URL to the telecommunications device via the first network connection. Execution of the instructions further cause the processor to receive a request for the second encrypted data from the second server from the first server using a wired network connection to access the web service at the URL. Execution of the instructions further cause the processor to send the second encrypted data to the first server using the wired network connection in response to the request of the second encrypted data by the second server.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which:

FIGS. 2A and 2B illustrate a method of operating the telecommunication system of claim 1;

FIG. 3 illustrates a further method of operating a telecommunication system; and FIG. 4 illustrates a further method of operating a telecommunications system.

DETAILED DESCRIPTION

Like numbered elements in these figures are either equivalent elements or perform the same function. Elements which have been discussed previously will not necessarily be discussed in later figures if the function is equivalent.

Figure 1:
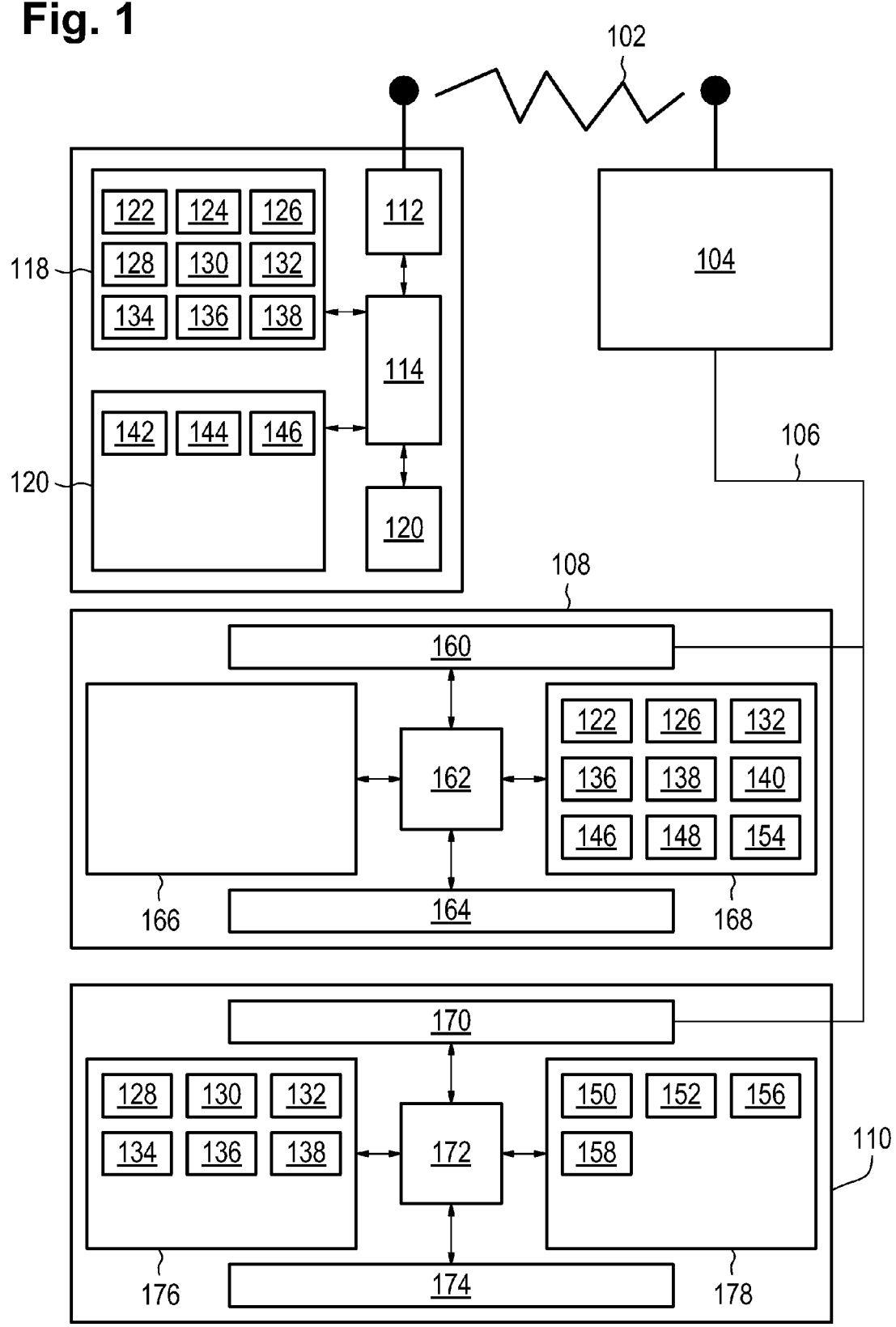
FIG. 1 illustrates a telecommunication system.

FIG. 1 shows an example of a telecommunications system. The system comprises a telecommunications device 100 which is connected via a wireless telecommunications connection 102 to a base station 104. For instance the telecommunications device could be a mobile telephone or a smart phone. The base station 104 is connected via a wired network connection 106 to a first server 108 and a second server 110. The first server 108 and the second server 110 may be computer processing devices for computer systems.

The telecommunications device 100 is shown as comprising a transceiver 112, a processor 114 and a battery 120, storage 118, and memory 120. The storage 118 is shown as containing unencrypted data 122, an encryption key 124, an order request 126, a data publishing request 128, a public key 130, a private key 132, first encrypted data 134, second encrypted data 136 and a URL 138.

The memory 120 is shown as containing a control module 142 which contains executable code which enables the processor 114 to run and control the telecommunications device 100. The memory 120 is further shown as containing a first encryption algorithm 144 that works with the encryption key 124. The first encryption algorithm 144 may for example be a symmetric or a asymmetric encryption algorithm. The computer memory 120 is further shown as containing a public key pair encryption algorithm 146 that works with the public key 130 and the private key 132. The contents as shown in the storage 118 and the memory 120 may not be present within the memory 120 or the storage 118 at the same time. Various contents of the storage 118 may be deleted at various points within execution of the method.

The first server 108 is shown as containing a network interface 160, a processor 162, an optional user interface 164, storage 166 and memory 168.

Likewise the second server 110 is shown as containing a network interface 170, a processor 172, an optional user interface 174, storage 176, and memory 178. The contents of the storages 166, 176 may not all be present at the same time. Likewise the contents of the memories 168, 178 may also not all be present at the same time too.

In examining the second server 110 the storage 176 is shown as containing a data publishing request 128 received from the telecommunications device 100. The computer storage 176 is further shown as containing a first encrypted data 134 that was received from the telecommunications device 100. The computer storage 176 is further shown as containing a public key 130 and the private key 132 which were generated by the second server 110. The computer storage 176 is further shown as containing second encrypted data 136 that was received from the telecommunications device 100. The computer storage 176 is further shown as containing a URL 138 for a web service generated by the second server 110.

The memory 178 of the second server 110 is shown as containing a control module 156 which contains computer executable code which enables the processor 172 to operate and function the second server 110. The memory 178 is further shown as containing a key generation algorithm or module 150. The key generation module 150 contains code which enables the processor 172 to generate the private key 130 and the public key 132. The memory 178 further contains a web service generator 152 which provides the URL 138 and also execution of the web service to provide the second encrypted data 136 via the network connection 106.

The first server 108 in the memory 168 is shown as having a security module or security application 154. The security module 154 contains code which enables the processor 162 to execute the method. The use of the security module 154 may be beneficial because it prevents other programs being executed by the processor 162 from having access to data that is being processed. The memory 168 of the first server 108 is further shown as containing second encrypted data 136 and a URL 138. The computer memory 168 is further shown as containing an order request 126 that was received from the telecommunications device 100. The computer memory 168 is further shown as containing a private key 132 that was received with the URL 138 from the telecommunications device 100. The private key 132 can be used to decrypt the second encrypted data 136.

The computer memory 168 is further shown as containing unencrypted data 122 that was encrypted from the second encrypted data 136 using the private key 132 by the security module 154. The computer memory 168 is further shown as containing combined data 140. The combined data 140 is a combination of the order request 126 and the unencrypted data 122. The memory 168 is further shown as containing a public key pair encryption algorithm 146 which may be used by the security module 154 to use the private key 132 to decrypt the second encrypted data 136. The memory 168 is further shown as containing a control module 148 which contains code or instructions to enable the processor 162 to control the operation and function of the first server 108. The memory 168 is further shown as containing a security module or security program 154.

The security module contains code which enables the processor 162 to receive and process data received from the telecommunications device 100 and the second server 110 securely. For example the various pieces of data are illustrated as being contained in the memory 168 instead of in the storage 166. In this particular example this may provide more security because the security module 154 maintains all of the data within the memory and does not store it in the storage 166 where it may be accessible to other programs or applications being run on the first server 108. Not all contents of the storage 166 and the memory 168 may be present at the same time. Various variations of the method may involve deleting various pieces of the data to protect them.

Figure 2A:
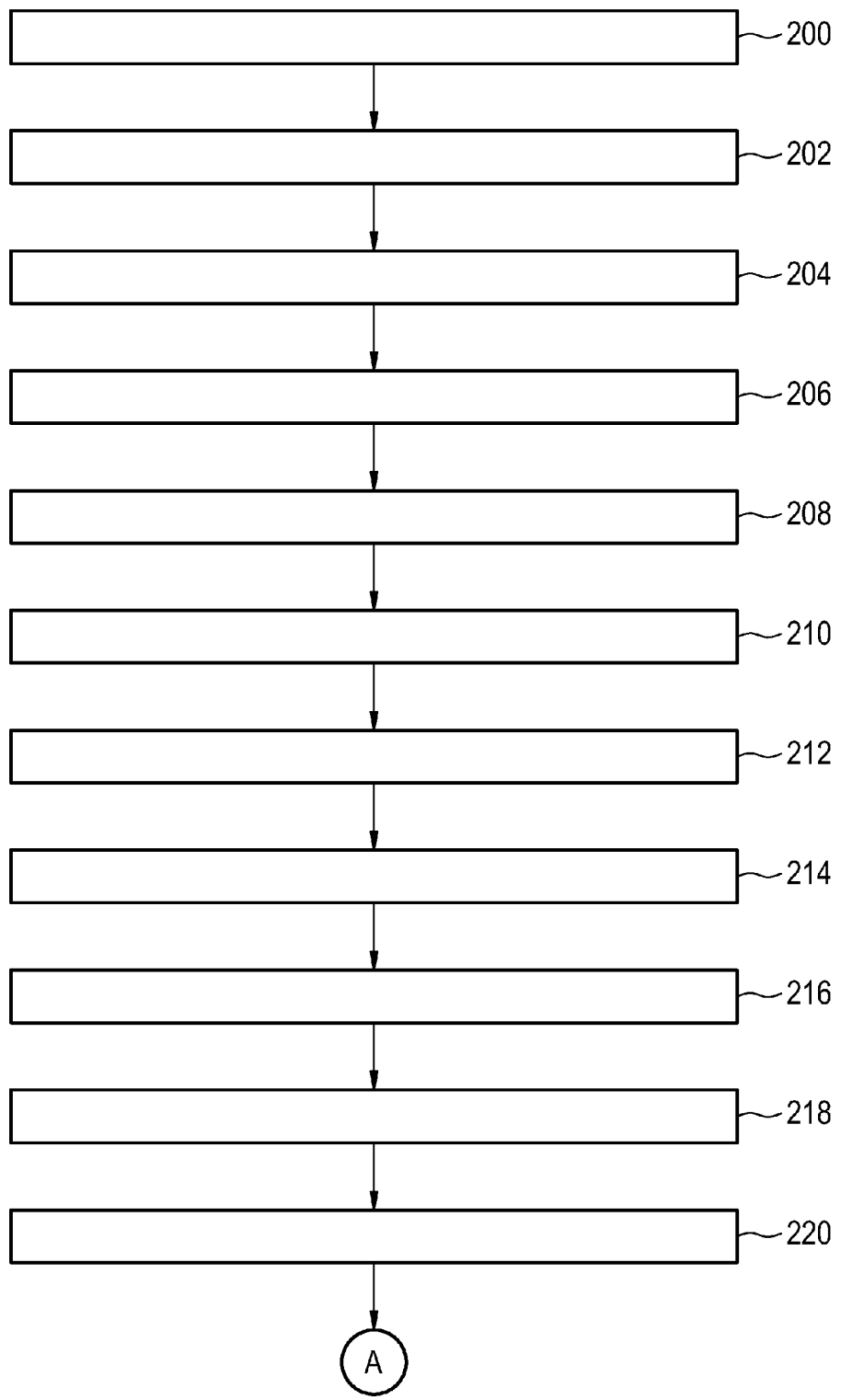

FIGS. 2a and *b* show a flowchart which illustrates an example of a method. The method shown in FIGS. 2a and 2b can be used to operate the telecommunications system of FIG. 1. First in step 200 the telecommunications device 100 encrypts the unencrypted data 122 into the first encrypted data 134 using the encryption key 124 with the first encryption algorithm 144. Next in step 202 the telecommunications device 100 sends the first encrypted data 134 via the wireless telecommunication link 102 to the base station 104 which then forwards the first encrypted data 134 to the second server 110. In step 204 the first encrypted data 134 is stored by the second server 110. Then in step 206 the telecommunications device 100 sends an order request 126 to the first server 108 via a second network connection that is formed by the wireless telecommunication connection 102 and the wired network connection 106. Next in step 208 the telecommunications device 100 sends a data publishing request 128 to the second server 110 via the first network connection.

In step 210 the second server 110 generates the cryptographic key pair which comprises the public key 130 and the private key 132 in response to receiving the data publishing request 128. Next in step 212 the second server 110 sends the first encrypted data 134, the public key 130, and the private key 132 to the telecommunications device 100 in response to the data publishing request 128 via the first network connection. In some alternative examples the telecommunications device deletes the unencrypted data 122 after it has been encrypted into the first encrypted data 134. Next in step 214 the telecommunications device 100 decrypts the first encrypted data 134 into the unencrypted data 122 using the encryption key 124 and the first encryption algorithm 144. Next in step 216 the telecommunications device 100 encrypts the unencrypted data 122 into the second encrypted data 136 using the public key 130. Next in step 218 the telecommunications device sends the second encrypted data 136 to the second server 110 via the first network connection. Then in step 220 the second server 110 generates a web service for providing the second encrypted data via a URL 138 by the second server.

In step 222 the second server 110 sends the URL 138 to the telecommunications device via the first network connection. In some examples step 222 and step 212 are combined together in one step. Next in step 224 the telecommunications device 100 sends the URL 138 and the private key 132 to the first server 108 via the second network connection. Next in step 226 the first server 108 requests the second encrypted data from the second server 110 using a wired network connection 106 to access the web service at the URL 138. In step 228 the first server 108 sends the second server 110 the second encrypted data 136 in response to the request of the second encrypted data 138 by the second server. Next in step 230 the first server 108 decrypts the second encrypted data 136 into the unencrypted data 122 using the private key 132. Then finally in step 232 the first server 108 combines the order request 126 with the unencrypted data 122. In some examples combining the order request with the unencrypted data may mean processing an order or processing a financial transaction. In other cases the data is simply combined or concatenated.

FIG. 3 shows a flowchart which illustrates an alternate method. In this case the telecommunications device is represented as a user. The second server 110 is a cloud service for providing privacy data and the first server is a shopping website. In a first step the user's data is registered and storage and all data is encrypted and stored using a particular decryption key 300 on the cloud service. Next in step 302 the user requests to buy a book from the shopping website 108. Next the user sends a request to the cloud service to publish the data that the user has stored on the cloud service. This leads to the cloud service in step 306 generating the web service or other format of data. Then in step 308 the cloud service sends the URL to the user 100. The user then provides the decrypt key and the URL in step 310 to the shopping website. The shopping website then retrieves the decrypted data in step 312 from the cloud service. The shopping website can then decrypt the data and delivers the book 314 to the customer. In step 316 the user gets the book. In step 318 the web service for the URL expires. Now all steps performed in FIG. 2 are shown in FIG. 3 or 4.

FIG. 4 shows a further alternative method with several steps added. After step 304 the user client uses the encryption key to decrypt the data which is needed to be published and the encrypt key and encrypt using another decrypt key. The newly encrypted data is then sent to the web service in step 306 or the method proceeds as was illustrated in FIG. 3.

Examples may have one or more of the following benefits:
1. Personal data is kept in one place which can be published to others. (i.e., if you shop on internet you should tell the seller your address)
2. All stored data is encrypted and the main password key is held by the end user.
3. When one needs to provide sensitive data the data can be provided selectively:
    a. User just provide with limited information. Use a temporary URL with a temporary password key in it (for example: address info or phone number or both, depends on concrete scenario.)
    b. Information is published in limited period. ex: just valid in 2 days or 8 hours.
    c. All published data also be encrypted and the key is just sent to the specific (with the temporary URL or other format) target. For example, Data is published to website A and B, but A and B hold different key and access the data by different URL (or other connection)

An example of an additional method is:
1. Maintain privacy information on the privacy cloud service website
    1.1 User inputs his privacy information on the privacy cloud service website.
        i. Sample:
            1. Name: xxxxx
            2. Age: xxxxxx
            3. Passport id: xxxxxxx
            4. . . .
    1.2 User inputs the encryption key (it can be a long password chars or a digital certificate) to save the information.
    1.3 The cloud service website will encrypt the information using the given key. (but not save the key)

2. User buys a book on the online bookstore.
   2.1 User buys a book on the online bookstore.
   2.2 The bookstore requires the address and cellphone number as emergency contact.
3. User goes to the privacy cloud service website to generate the web service to provide the address and cellphone number.
   3.1 User inputs the encrypt key let the privacy cloud service website decrypt the information and show the information as a list (it also can be other layout) to user.
      3.1.1 Sample
         a. [x] home address: XXXXXX
         b. [x] phone number: XXXXXXX
         c. [ ] age
         d. [ ] passport number
   3.2 User selects a home address and a phone number, inputs another password to generate a web service (it can be a url refer to a picture include home address or phone number. It also can be a url refer to html web page or other format. The web service format depends on the web shop's requirement)
      3.2.1 The service could be accessed by a URL
      3.2.2 The home address and the phone number are encrypted by the password user just input and save in another place (not same with the whole information stored in, and the privacy cloud service website also do not save the password).
      3.2.3 The service is valid only in limit period depends on user input (ex: 2 days) (User also can marked it as manual to set invalid)
4. User inputs the new password and URL into the online bookstore.
   4.1 The bookstore will save the URL and the password into database.
5. The bookstore delivers the book to user
   5.1 Bookstore access the web service using the URL and password
   5.2 The privacy cloud service website decrypted the address and cellphone number information and show the information to the bookstore.
   5.3 The bookstore prints the address and cellphone number out and post on the deliver box.
   5.4 User receives the book
   5.5 User goes to the privacy cloud service website to set the URL invalid (or 2 days later it invalid automatically depends on user setting)
   5.6 The privacy cloud service website delete temporary data from disk.

LIST OF REFERENCE NUMERALS 100 telecommunications device
102 wireless telecommunications connection
104 base station
106 wired network connection
108 first server
110 second server
112 transceiver
114 processor
116 battery
118 storage
120 memory
122 unencrypted data
124 encryption key
126 order request
128 data publishing request
130 public key
132 private key
134 first encrypted data
136 second encrypted data
138 URL
140 combined data
142 control module
144 first encryption algorithm
146 public keypair encryption algorithm
148 control module
150 key generation algorithm $2^{nd}$
152 web service generation module $2^{nd}$
154 security module
156 control module
158 URL generation module
160 network interface
162 processor
164 user interface
166 computer storage
168 computer memory
170 network interface
172 processor
174 user interface
176 computer storage
178 computer memory

The invention claimed is:
1. A telecommunication method of securely exchanging unencrypted data between a telecommunications device and a first server computer system via a digital cellular wireless telecommunications network, wherein the telecommunications device is a battery powered mobile end user telecommunications device, wherein the method comprises:
   encrypting the unencrypted data using a first encryption algorithm into first encrypted data by the telecommunications device;
   sending the first encrypted data to a second server computer system via a first network connection of the digital cellular wireless telecommunications network by the telecommunications device;
   storing the first encrypted data by the second server computer system;
   sending an order request to the first server computer system via a second network connection of the digital cellular wireless telecommunications network by the telecommunications device;
   sending a data publishing request to publish the unencrypted data to the second server computer system via the first network connection by the telecommunications device;
   generating a cryptographic key pair by the second server computer system in response to the data publishing request, wherein the cryptographic key pair comprises a public key and a private key;
   sending the first encrypted data, the public key, and the private key to the telecommunications device in response to the data publishing request via the first network connection by the second server computer system;
   decrypting the first encrypted data into the unencrypted data by the telecommunications device;
   encrypting the unencrypted data into second encrypted data using the public key by the telecommunications device;
   sending the second encrypted data to the second server computer system via the first network connection by the telecommunications device;

generating a web service for providing the second encrypted data via an URL by the second server computer system;

sending the URL to the telecommunications device via the first network connection by the second server computer system;

sending the URL and the private key to the first server computer system via the second network connection by the telecommunications device;

requesting the second encrypted data from the second server computer system by the first server computer system using a wired network connection to access the web service at the URL;

sending the second encrypted data to the first server computer system by the second server computer system using the wired network connection in response to the request of the second encrypted data by the second server computer system;

decrypting the second encrypted data by the first server computer system into the unencrypted data using the private key; and combining the order request with the unencrypted data by the first server computer system.

2. The method of claim 1, wherein the web service becomes inoperative after a predetermined duration.

3. The method of claim 1, wherein the method further comprises of deleting any one of the following after combining the order request with the unencrypted data by the first server computer system: the unencrypted data, the second encrypted data, the URL, and the private key, and combinations thereof.

4. The method of claim 1, wherein the first server computer system is prevented from storing the unencrypted data after combining the order request by a security application, wherein reception of the second encrypted data by the second server computer system from the first server computer system using the wired network connection to access the web service at the URL is performed by the security application, wherein the decrypting the second encrypted data by the first server computer system into the unencrypted data using the private key is performed by the security application.

5. The method of claim 4, wherein the reception of the order request from the telecommunications device to the first server computer system via the wired network connection is performed by the security application.

6. The method of claim 1, wherein the method further comprises sending a data request from the first server computer system to the telecommunications device via the first network connection in response to the order request, wherein the method further comprises redacting the unencrypted data in accordance with the data request before encrypting the unencrypted data into the second encrypted data.

7. The method of claim 1, wherein the unencrypted data comprises payment data.

8. The method of claim 1, wherein the unencrypted data comprises payment address data.

9. The method of claim 1, wherein the second server computer system is a cloud storage server.

10. The method of claim 1, wherein the first server computer system is an online shop.

11. The method of claim 1, wherein the method further comprises deleting the second encrypted data from the telecommunications device after sending the second encrypted data to the second server computer system via the first network connection.

12. The method of claim 1, wherein the method further comprises deleting the unencrypted data from the telecommunications device after encrypting the unencrypted data into the second encrypted data using the public key.

13. The method of claim 1, wherein the method further comprises of deleting the unencrypted data from the telecommunications device after encrypting the unencrypted data into the first encrypted data.

14. The method of claim 1, wherein the method further comprises deleting the first encrypted data from the telecommunications device after sending the first encrypted data to the second server computer system.

15. A second server computer system for exchanging unencrypted data between a telecommunications device and a first server computer system via a digital cellular wireless telecommunications network, wherein the telecommunications device is a battery powered mobile end user telecommunications device, wherein the second server computer system comprises:

a memory for storing machine executable instructions and a processor for executing the machine executable instructions, wherein execution of the machine executable instructions causes the processor to:

receive first encrypted data via a first network connection of the digital cellular wireless telecommunications network from the telecommunications device;

store the first encrypted data;

receive a data publishing request to publish the unencrypted data via the first network connection from the telecommunications device;

generate a cryptographic key pair by the second server computer system in response to the data publishing request, wherein the cryptographic key pair comprises a public key and a private key;

sending the first encrypted data, the public key, and the private key to the telecommunications device in response to the data publishing request via the first network connection;

receiving second encrypted data from the second server computer system via the first network connection from the communications device;

generating a web service for providing the second encrypted data via an URL;

sending the URL to the telecommunications device via the first network connection;

receiving a request for the second encrypted data from the second server computer system from the first server computer system using a wired network connection to access the web service at the URL; and sending the second encrypted data to the first server computer system using the wired network connection in response to the request of the second encrypted data by the second server computer system.

* * * * *